April 9, 1940.    F. L. PRESCOTT    2,196,228
INTERNAL COMBUSTION ENGINE
Filed April 6, 1938    5 Sheets-Sheet 1
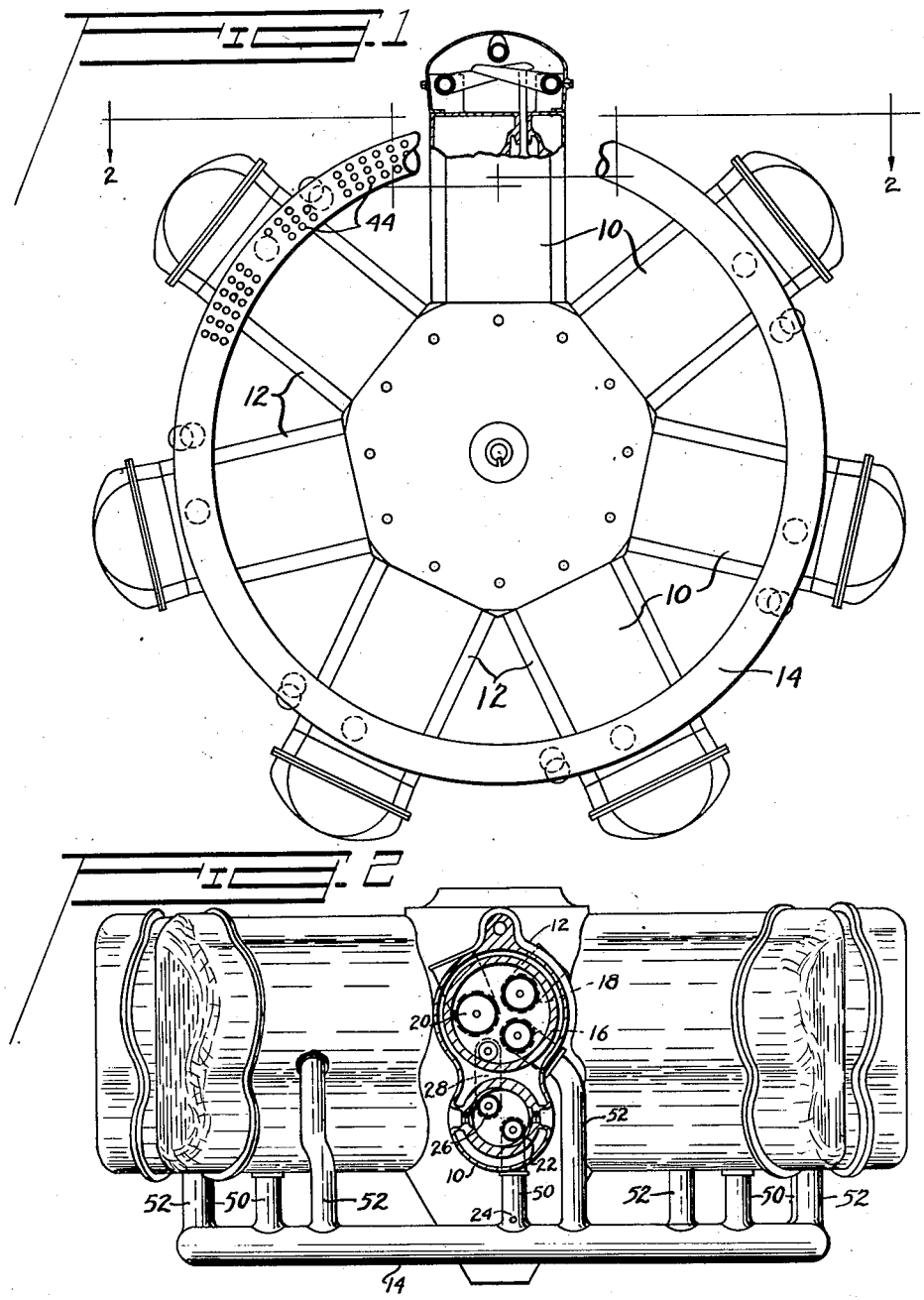
INVENTOR.
FORD L. PRESCOTT
ATTORNEYS

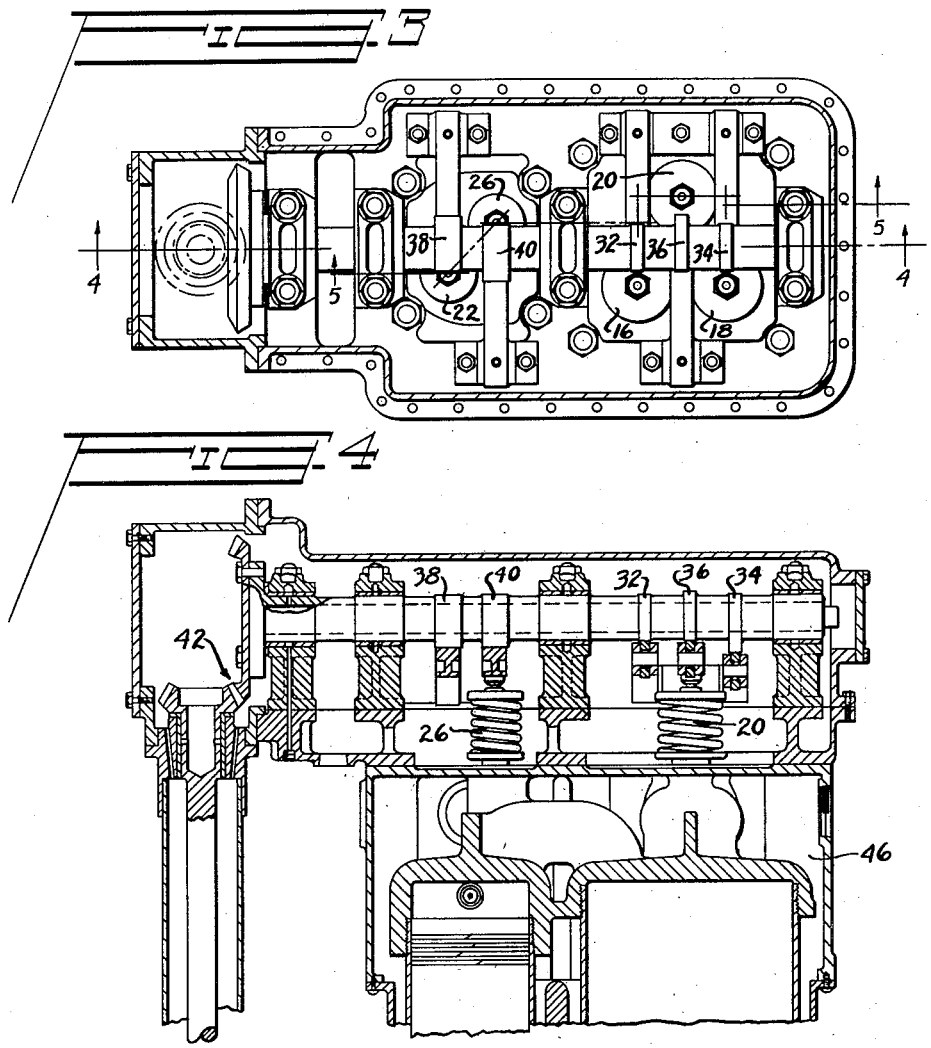

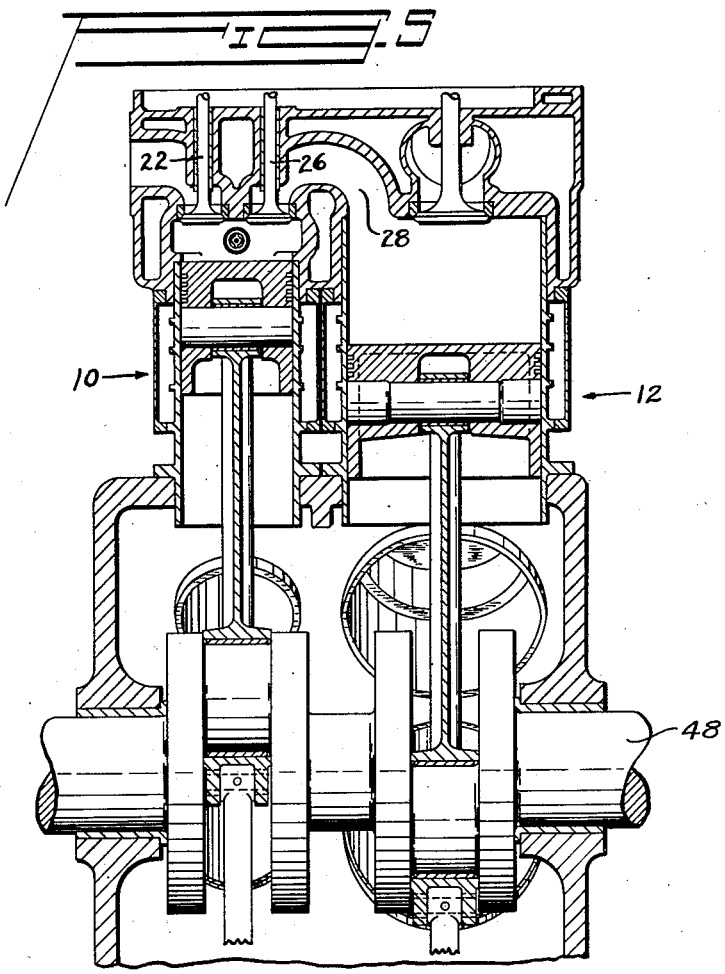

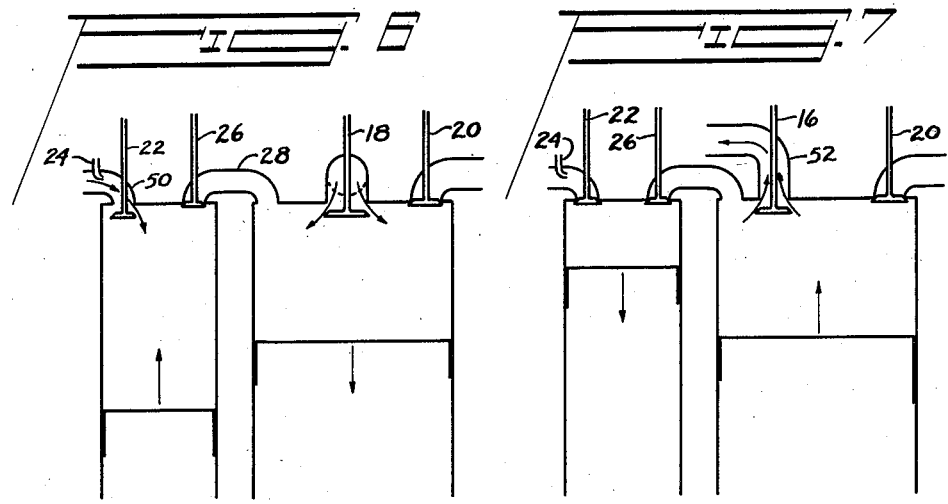
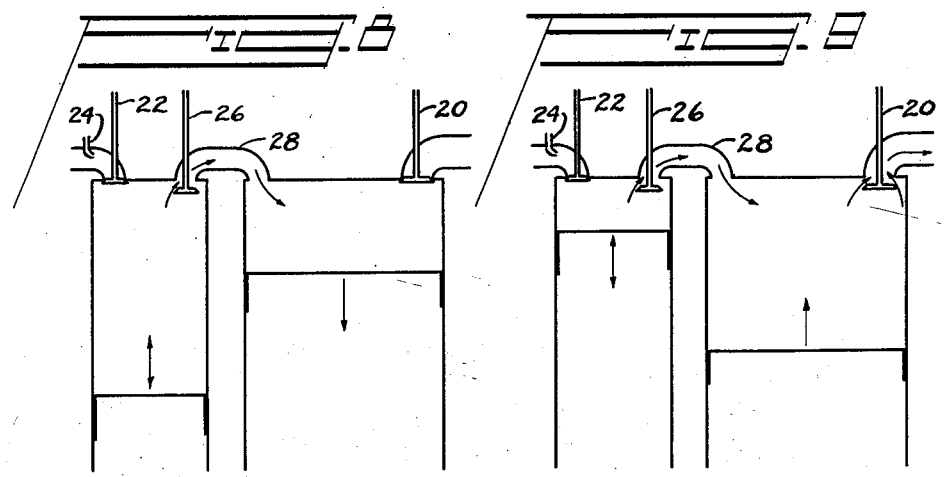

April 9, 1940.  F. L. PRESCOTT  2,196,228
INTERNAL COMBUSTION ENGINE
Filed April 6, 1938  5 Sheets-Sheet 5
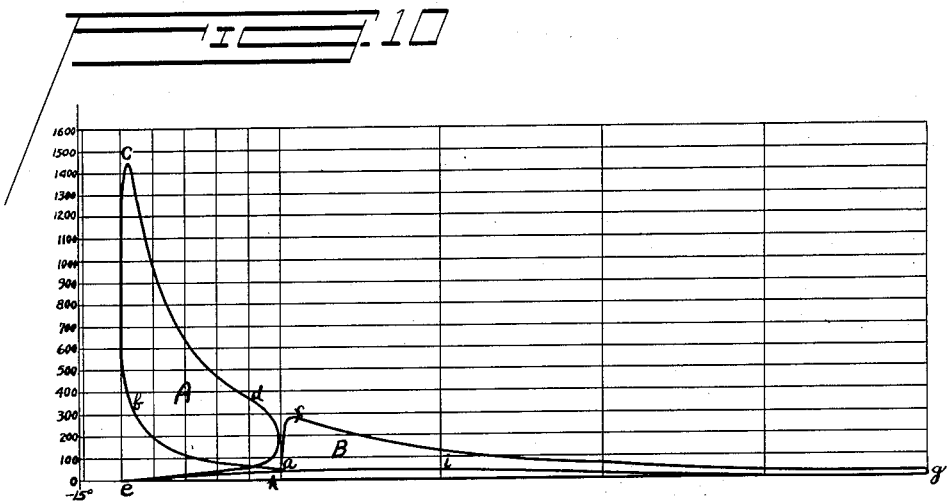
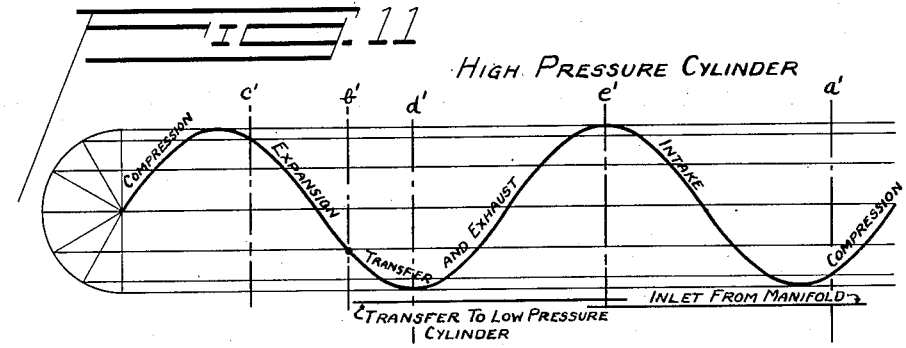
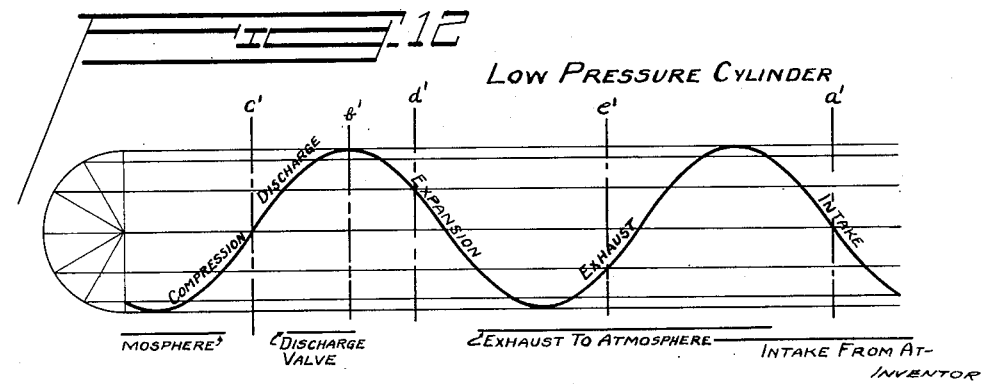
INVENTOR
FORD L. PRESCOTT
BY
ATTORNEYS Patented Apr. 9, 1940

2,196,228

UNITED STATES PATENT OFFICE 2,196,228

INTERNAL COMBUSTION ENGINE

Ford L. Prescott, Dayton, Ohio

Application April 6, 1938, Serial No. 200,330

6 Claims. (Cl. 60—15)

(Granted under the act of March 3, 1883, as amended April 30, 1928; 370 O. G. 757)

The invention described herein may be manufactured and used by or for the Government for governmental purposes, without the payment to me of any royalty thereon.

It is well known that the theoretical thermal efficiency of the internal combustion engine is given by the equation that $$E = 1 - \frac{1}{R^{K-1}}$$

wherein R is the ratio of compression or expansion and K is the adiabatic index of compression or expansion. From this it is seen that in order to increase the efficiency of the internal combustion engine, it is necessary to increase the compression and expansion ratio of the engine.

Efforts to achieve high thermal efficiency by increase of compression and expansion ratio in the conventional internal combustion engine have been limited by the detonation or knock characteristics of the fuel, limiting the usable compression ratio to values of 8:1 or less. The theoretical efficiency of an engine having 8:1 compression ratio by the foregoing formula is 56.5 per cent.

Efforts to improve or to increase the power output of a conventional internal combustion engine by providing additional expansion of the exhaust products have proven impracticable for the reason that the available energy in the exhaust is insufficient to drive the auxiliary apparatus. Therefore, in such devices, the gain in power has not been comparable with the increase in weight and mechanical losses in the engine.

As a means of deriving increased efficiency, the Diesel cycle was developed, wherein no fuel is present during the compression of the air, the fuel being injected into the heated air after compression. The compression ratios of Diesel engines have been limited by practical considerations to values of 16:1 or less. On this basis, the theoretical efficiency of the Diesel engine having the compression of 16:1 would be 67 per cent.

In a highly supercharged engine, the process of compression is broken down into two stages to obtain an ultra-high compression ratio. The air, after being compressed in the primary stage, is delivered to a receiver or manifold in which the heat of compression is preferably removed prior to the second stage of compression, thus reducing the tendency of the charge to detonate. It thus becomes practicable, with sufficient cooling, to utilize a compression ratio of 25:1 or more, with existing fuels and without the destructive effect of detonation.

When utilizing a high pressure and a low pressure cylinder, where as illustrated by the specific example described hereinafter the compression ratio of the high pressure cylinder is quite moderate, such as 5:1, it is manifest that an expansion ratio of only 5:1 after combustion would be insufficient to derive from the combustion the high theoretical efficiency indicated by the compression ratio of 25:1 which is 72.4 per cent. For this reason it is desirable to deliver the products of combustion from the high pressure cylinder to a low pressure cylinder of such capacity as to further expand the products of combustion to the desired final volume of approximately twenty-five times the initial volume, thus utilizing available energy from the high pressure cylinder which otherwise would be wasted.

It is thus evident that increase of compression ratio alone without increase of expansion ratio will increase the power output but not the thermal efficiency because of the incomplete expansion of the products of combustion. However, by increasing the compression ratio and likewise increasing the expansion ratio, both the power output and thermal efficiency are materially increased.

It has heretofore been proposed to increase the compression ratio and the expansion ratio of an internal combustion engine by utilizing a piston and cylinder arrangement in which a low pressure cylinder provides a compression chamber and an expansion chamber, the compression chamber serving to alternately supercharge two high pressure cylinders, and the expansion chamber serving to alternately receive the products of combustion from the high pressure cylinders for further expansion, and by utilizing a cyclic arrangement whereby the high pressure cylinders are displaced in phase 180 degrees from the low pressure cylinders. With such an arrangement, the pressure cylinder is operating to expel the products of combustion from the high pressure cylinder to the low pressure cylinder when the low pressure cylinder is acting to expand the products of combustion, with the result that the maximum available expansion volume is reduced by the displacement of the high pressure cylinder. Furthermore, the time of opening of the high pressure cylinder exhaust valve is necessarily delayed beyond that which is desirable in order to reduce to a minimum the compression of the products of combustion from the high pressure cylinder by the low pressure cylinder. This arrangement does not permit of the maximum scavenging of the high pressure cylinder, causing the high pressure piston to work against a higher exhaust pressure during its exhaust, and also increasing the loss of heat energy to radiation because of the increased retention of the products of combustion in the high pressure cylinder.

In accordance with my invention, provision is made for obtaining a cyclic operation of the compounding of the compression and expansion of the working fluid such that the products of combustion of the high pressure cylinder are continuously expanded substantially throughout the duration of the combined expansion stroke of the high and low pressure pistons. This is accomplished by phasing the low pressure piston sufficiently behind the high pressure piston so that top dead center will be reached substantially at the instant the high pressure exhaust transfer valve opens. This permits opening of the high pressure exhaust valve at a point in the cycle, appreciably before bottom dead center, permitting the products of combustion to substantially continuously expand without interruption throughout the complete expansion stroke of the high and low pressure pistons, resulting in a minimum loss of heat by radiation.

An example of my invention is illustrated in the drawings which form a part of this specification in which:

Fig. 1 is a front elevational view of a radial type engine showing portions of one of the cylinders broken away and in section;

Fig. 2 is a sectional view taken along the line 2—2 of Fig. 1;

Fig. 3 is a top plan view of one of the radial cylinder units with the valve cover partially broken away;

Fig. 4 is a sectional view taken along the line 4—4 of Fig. 3;

Fig. 5 is a partial sectional view taken along the line 5—5 of Fig. 3, the valve operating mechanism being removed and the valves being broken away.

Figs. 6, 7, 8, and 9 are diagrammatic views showing different operating positions in the cyclic operation of the engine;

Fig. 10 is a pressure-volume indicator diagram of the high and low pressure cylinders;

Fig. 11 is a diagram showing the cyclic relation of the high pressure piston; and Fig. 12 is a diagram showing the cyclic relation of the low pressure cylinder.

Referring to the drawings, in Figs. 1 and 2 is shown a radial engine of the four-stroke cycle type with seven high pressure cylinders 10 having a compression ratio of 5 to 1, and seven low pressure cylinders 12 having a displacement volume 4 times that of the high pressure cylinder, constituting seven working groups, each working group comprising a high pressure cylinder and a low pressure cylinder arranged in tandem as best shown in Fig. 5, all of the seven working groups and their associated mechanisms are alike in construction and a description of one will suffice for an understanding of this invention. Each of the low pressure cylinders is associated with a common receiver or manifold 14 into which the low pressure cylinders deliver the compressed air at certain definite time intervals in the cycle of operation, so that collectively they serve to supercharge all of the high pressure cylinders, but serve individually to complete the expansion of the products of combustion from only a corresponding one of the high pressure cylinders. Each of the low pressure cylinders is provided with a discharge valve 16 for establishing communication between the low pressure cylinder and the manifold 14, and with an intake valve 18 for admitting air to the low pressure cylinder, and is also provided with an exhaust valve 20 for releasing the expanded products of combustion to atmosphere. The high pressure cylinder is provided with an inlet valve 22 to admit therein the compressed air, after mixing with fuel, received from the fuel supply jet 24, as indicated in Figs. 2 and 6. The high pressure cylinder is also provided with a transfer valve 26 to enable the transfer of the partially expanded products of combustion from the high pressure cylinder to the low pressure cylinder through the passage 28. All of these valves are actuated in predetermined time relation preferably by means of a camshaft 30 that is provided with cams 32, 34, 36, 38 and 40 corresponding to each of valves 16, 18, 20, 22 and 26 respectively and driven through a gear drive 42 drivingly connected to the crankshaft in the well known manner (not shown). The manifold 14 is preferably constructed in the form of an annular radiator for dissipating to atmosphere the heat of the compressed air confined therein by utilizing a plurality of cooling tubes 44, shown in Fig. 1, which extend therethrough. The cylinders are liquid cooled by any well known method and, as illustrated, are cooled by means of a water jacket 46. The cooling of the cylinders may be supplemented if desired by forming the cylinders with fins (not shown). The valve members are preferably constructed with a cavity in which is a liquid metallic coolant (not shown) which serves to transfer by convection the heat from the heated head to the valve stems which are surrounded by the liquid coolant of the engine, in the conventional manner. Each working group has the corresponding pistons thereof connected to the crankshaft 48 in such phase relation that the low pressure piston is at top dead center at or near the time when the high pressure transfer valve 26 is first opened to transfer the partially expanded gases from the high pressure to the low pressure cylinder, so that an uninterrupted expansion of the gases is effected.

In the operation of the engine and as illustrated by way of example, referring to Figures 6 to 12, it will be seen that Figure 11 and Figure 12 are shown in a preferred relation one to the other in which the low pressure piston is at top dead center at the instant the transfer valve opens in the high pressure cylinder which positions are designated b'. By this preferred arrangement, the partially expanded gases from the high pressure cylinder are immediately transferred to the low pressure cylinder without interruption in the expansion of the gases, since the low pressure cylinder is so timed as to immediately complete the expansion of the gases, thus avoiding unnecessary loss of heat and conserving the maximum amount of energy available for conversion into work.

The four major events of the cycle are illustrated by Figs. 6 to 9. Fig. 6 shows the position of the pistons, direction of motion, and position of the valves at the instant illustrated at a' of Figs. 11 and 12 in the cycle of operation of the engine. At this point the low pressure piston is half way down on its intake stroke. The intake valve 18 is therefore shown open and preferably air alone is entering the low pressure cylinder. At this instant the high pressure piston has just completed its intake stroke and has begun its upward motion, the intake valve 22 being still open, allowing supercharged air mixed with fuel to enter the high pressure cylinder. The fuel is preferably added by injection by a pump (not shown) and, as illustrated, is injected through the jet 24 in the individual intake pipe 50 between the manifold and the intake valve.

Figure 7 corresponds to position c' in Figs. 11 and 12, at which time the low pressure piston is half way up its compression stroke and is shown discharging the air contained therein through valve 16 and discharge pipe 52 into the manifold from which the high pressure cylinders draw their air supply. The high pressure piston is shown starting down its power stroke, the charge within the cylinder having been compressed and burned, the inlet and transfer valves 22 and 26 being closed.

Fig. 8, which corresponds to position d' in Figs. 11 and 12, shows the beginning of the transfer stroke with the high pressure piston at bottom dead center, the transfer valve 26 having previously opened at approximately the point where the low pressure piston was at top dead center. The low pressure piston is shown starting down on its power stroke further expanding the gases which were partially expanded in the high pressure cylinder and which are being transferred from the high pressure to the low pressure cylinder.

Fig. 9, which corresponds to position e' in Figs. 11 and 12, shows the high pressure piston near the end of its transfer stroke, the high pressure piston being at top dead center and the transfer valve 26 being open. At this time the low pressure piston has started its exhaust stroke and exhaust valve 20 is open, permitting discharge of the expanded products of combustion from both high pressure and low pressure cylinders.

The high pressure cylinder performs a cycle of operation illustrated by the high pressure portion A of the indicator card shown in Fig. 10. The compression stroke of the high pressure cylinder is illustrated by the line a—b after which combustion takes place as illustrated by the line b—c, spark-ignition having occurred by the utilization of spark plugs for each cylinder (Figs. 4 and 5 and the spark plug openings in the high pressure cylinder in Fig. 2) and conventional ignition current supply (not shown) approximately at the point b. Thereafter, the products of combustion expand in the high pressure cylinder from c to d, at which point the transfer valve 26 opens, permitting the partially expanded gases to pass from the high pressure cylinder into the low pressure cylinder and remains open during the interval illustrated by the line d—e, which completes the exhaust stroke of the high pressure cylinder. The intake stroke of the high pressure cylinder is illustrated by the line e—a, thus completing the cycle of the high pressure cylinder.

The low pressure portion B of the diagram, Fig. 10, illustrates the action in the cycle of operation of the low pressure cylinder in which a—f shows the pressure rise in the low pressure cylinder immediately following the opening of the transfer valve of the high pressure cylinder, this pressure rise taking place at approximately top dead center position. Line f—g represents the expansion of the products of combustion in the low pressure cylinder. Line g—k represents the exhaust stroke of the low pressure cylinder. Line k—g represents the intake stroke of the low pressure cylinder. g—i represents the compression stroke of the low pressure cylinder up to the point i where the discharge valve 16 opens, permitting the compressed air to pass from the low pressure cylinder into the manifold of the high pressure cylinder, the transfer portion of the cycle being represented by line i—a, thus completing the cycle of the low pressure cylinder.

It is thus seen that all combustion takes place in the high pressure cylinder and that only partially expanded products of combustion are discharged into the low pressure cylinder where the expansion is completed. The low pressure cylinder also serves as a compressor to supercharge the high pressure cylinder. It is seen by examination of both high and low pressure diagrams in Fig. 10 that during the portion of the transfer stroke of the high pressure cylinder from the opening of the transfer valve to bottom dead center of the high pressure cylinder, the high pressure piston acts in cooperation with the low pressure piston to expand the products of combustion.

The above desired cycle of operation is best obtained by timing the low pressure piston approximately 120 degrees behind the high pressure piston. For the most advantageous operation of the high pressure cylinder, the transfer valve should open approximately 60 degrees before the bottom dead center position of the high pressure piston. It is obvious therefore that the best operation of the low pressure cylinder will be obtained if the low pressure piston is so timed as to be at top dead center approximately at the point of opening of the transfer valve, thus further expanding the products of combustion with a minimum loss of available energy due to heat radiation.

Therefore, while in describing the construction and operation of this invention, one group of high and low pressure cylinders has been referred to for simplicity, nevertheless, it is to be understood that the invention is ordinarily carried into practice by using a multi-group of high and low pressure cylinders in a radial arrangement as illustrated herein or in an in-line arrangement, and that, while I have described certain features of the invention with particularity, the invention is not limited to the exact details and cycle which have been described but various modifications may be employed, as will be clear to those skilled in the art after reading this specification, the scope of the invention being indicated by the accompanying claims.

I claim:

1. In a combustion engine, a multi-stage compression for the air supplying the combustion cylinder and a multi-stage expansion means comprising, high and low pressure cylinders provided with inlets and outlets and having pistons operating therein, said pistons being coupled together in such phase relation that the expansion stroke of said low pressure piston begins before the termination of the expansion stroke of the high pressure piston and terminates during the exhaust stroke of said high pressure piston, and cooperating valves associated with said inlets and outlets for supplying supercharged air from said low pressure cylinder to said high pressure cylinder, for transferring the products of combustion from said high to said low pressure cylinder and for substantially completely exhausting the expanded gases from said high pressure cylinder to said low pressure cylinder and thence to atmosphere.

2. In a four cycle internal combustion engine a high pressure cylinder, a low pressure cylinder, means for delivering air from the low pressure cylinder to the high pressure cylinder and combustion gases from the high pressure cylinder to the low pressure cylinder, a piston for each of said cylinders; and means coupling said pistons together and controlling said delivery means in such a manner that said low pressure cylinder serves as an extension of the high pressure cylinder during a substantial portion of the expansion stroke and substantially throughout the exhaust stroke of the high pressure piston and terminates its expansion stroke after the termination of the expansion stroke of said high pressure piston.

3. In a combustion engine, a high pressure cylinder provided with an inlet and an outlet and having a piston operating therein, a low pressure cylinder provided with two inlets and two outlets one each of said low pressure cylinder inlets and outlets being connected to atmosphere, and having a piston operating therein, an engine crank shaft connected to said pistons in such manner that the low pressure piston is lagging behind the high pressure piston to such an extent that the low pressure piston commences its expansion stroke prior to and terminates after the termination of the expansion stroke of the high pressure cylinder, delivery means connecting the inlet of the high pressure cylinder with one of the outlets of the low pressure cylinder to provide a multi-stage compression for the air supplying the high pressure cylinder and connecting the outlet of the former with an inlet of the latter to provide a multi-stage expansion of the products of combustion including a transfer valve for transferring the products of combustion from the high to the low pressure cylinder and which opens before the termination of the expansion stroke of the high pressure piston and closes during the exhaust stroke of the low pressure piston.

4. In a combustion engine, a high pressure cylinder provided with an inlet and an outlet and having a piston operating therein, a low pressure cylinder provided with two inlets and two outlets one each of said low pressure cylinder inlets and outlets being connected to atmosphere, and having a piston operating therein, an engine crank shaft connected to said pistons in such manner that the low pressure piston is lagging behind the high pressure piston to such an extent that the low pressure piston commences its expansion stroke prior to and terminates after the termination of the expansion stroke of the high pressure piston, delivery means connecting the inlet of the high pressure cylinder with one of the outlets of the low pressure cylinder to provide a multi-stage compression for the air supplying the high pressure cylinder and connecting the outlet of the former with an inlet of the latter to provide a multi-stage expansion of the products of combustion including a transfer valve for transferring the products of combustion from the high to the low pressure cylinder, said transfer valve opening before the termination of the expansion stroke of the high pressure piston and closing after the expansion stroke of the low pressure piston and including a discharge valve for discharging the compressed charge to be delivered from the low pressure cylinder to the high pressure cylinder, said discharge valve being open during the latter part of the compression stroke of said low pressure piston.

5. In an internal combustion engine of the four stroke cycle type comprising in combination, a plurality of high pressure cylinders provided with pistons operating therein, a plurality of low pressure cylinders provided with pistons operating therein, an engine crankshaft, the pistons of said low pressure cylinders being coupled to the engine crank shaft in dephased relation to that of the high pressure pistons respectively in such manner that the expansion of any one of said low pressure pistons begins before the termination of the expansion stroke and terminates during the exhaust stroke of a corresponding high pressure piston, each of said high pressure cylinders having an inlet and an outlet, each of said low pressure cylinders having two inlets and two outlets, one each of said inlets and outlets connected to atmosphere, a manifold commonly coupled to the inlets of the high pressure cylinders and to one outlet of each of the low pressure cylinders and cooperating valves for controlling the delivery of the gaseous charge from the low pressure cylinders to the manifold and from the manifold to the high pressure cylinders including transfer valves respectively associated with said high pressure cylinders for delivering the products of combustion from said high pressure cylinders to said low pressure cylinders.

6. In an internal combustion engine of the four stroke cycle type comprising in combination, a plurality of high pressure cylinders provided with pistons operating therein, a plurality of low pressure cylinders provided with pistons operating therein, an engine crankshaft, the pistons of said low pressure cylinders being coupled to the engine crank shaft in dephased relation to that of the high pressure pistons respectively in such manner that the expansion of any one of said low pressure pistons begins before the termination of the expansion stroke and terminates during the exhaust stroke of a corresponding high pressure piston, each of said high pressure cylinders having an inlet and an outlet, each of said low pressure cylinders having two inlets and two outlets, one each of said inlets and outlets being connected to atmosphere, a manifold commonly coupled to the inlets of the high pressure cylinders and to certain of the outlets of the low pressure cylinders and cooperating valves for controlling the delivery of the gaseous charge from the low pressure cylinders to the manifold and from the manifold to the high pressure cylinders including transfer valves respectively associated with said high pressure cylinders for delivering the products of combustion from said high pressure cylinders to said low pressure cylinders, the delivery of the products of combustion commencing prior to the termination of the expansion stroke of the high pressure cylinder and approximately at the time when the low pressure piston is at the end of its compression discharge stroke and terminating after the exhaust stroke of said high pressure cylinder.

FORD L. PRESCOTT.